United States Patent
Rozendorn et al.

(10) Patent No.: US 9,372,631 B1
(45) Date of Patent: Jun. 21, 2016

(54) MANAGING VOLUME UPDATES RECEIVED DURING AN EXECUTION OF A VOLUME MIGRATION PROCESS

(71) Applicant: Infinidat LTD., Herzliya (IL)

(72) Inventors: Guy Rozendorn, Tel Aviv (IL); Tal Yalon, Tel Aviv (IL)

(73) Assignee: INFINIDAT LTD., Herzliya (IL)

(*) Notice: Subject to any disclaimer, the term of this patent is extended or adjusted under 35 U.S.C. 154(b) by 44 days.

(21) Appl. No.: 14/582,254

(22) Filed: Dec. 24, 2014

(51) Int. Cl.
*G06F 12/00* (2006.01)
*G06F 3/06* (2006.01)

(52) U.S. Cl.
CPC .............. *G06F 3/0619* (2013.01); *G06F 3/065* (2013.01); *G06F 3/067* (2013.01); *G06F 3/0647* (2013.01); *G06F 3/0653* (2013.01); *G06F 3/0665* (2013.01)

(58) Field of Classification Search
CPC ..... G06F 3/0619; G06F 3/0647; G06F 3/065; G06F 3/0653; G06F 3/0665; G06F 3/067
See application file for complete search history.

(56) References Cited

U.S. PATENT DOCUMENTS

| | | | | |
|---|---|---|---|---|
| 2006/0195666 A1* | 8/2006 | Maruyama | ............ | G06F 3/0613 711/162 |
| 2014/0297979 A1* | 10/2014 | Baron | .................... | G06F 3/0647 711/162 |

* cited by examiner

*Primary Examiner* — Shawn X Gu
(74) *Attorney, Agent, or Firm* — Reches Patents

(57) ABSTRACT

A method for updating a destination volume, the method may include monitoring duplicate traffic that represents original traffic that is exchanged between at least one host computer and a first storage system; wherein the monitoring is executed by a controller during an execution of a migration or a replication of a source volume of the first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and controlling, based upon the monitoring, a process of updating the destination volume with a set of source volume updates, wherein the set of source volume updates are reflected in the duplicate traffic and are received during the execution of the migration.

22 Claims, 7 Drawing Sheets

MANAGING VOLUME UPDATES RECEIVED DURING AN EXECUTION OF A VOLUME MIGRATION PROCESS

BACKGROUND

Port mirroring is a technique used by a network switch to duplicate network traffic that pass through one switch port and send it simultaneously through another switch port. Port mirroring is commonly used for monitoring network traffic.

Port mirroring can be used in a Fibre Channel switch to configure a switch port to mirror the traffic passing in both directions between specific source and destination ports. The duplicate traffic is transmitted via a mirror port of the Fibre-Channel switch, which can be connected to a protocol analyzer to troubleshoot Fiber Channel end-to-end link communications.

Volume migration or volume replication are processes of copying a volume (source volume) from one storage system to another volume (destination volume) of a second storage system, where the two storage systems may be located at different locations and both are coupled to a Storage Area Network (SAN) network that includes Fibre-Channel switches or other switches.

A volume replication (also called mirroring) is a process where a target volume continuously and indefinitely synchronizes with the source volume, so that the target volume is regarded as a mirror of the source volume.

A volume migration is a finite process where once the content of the source volume is migrated to its new location, the source and destination volumes no longer synchronize with each other, the source volume may be superseded by the destination volume, and the path of input output (IO) flow coming from a host server is redirected from the source volume to the migrated (destination) volume, by changing the host volume configuration. The volume migration involves copying the entire content of the source volume to the destination volume (which is empty when the migration starts), which can take a significant amount of time. During this time, the host should be able to continue reading and writing the content of the volume while being migrated.

Some migration techniques redirect the host access paths to the destination volume when the migration starts. In this case, write requests are only implemented at the destination volume. The read requests are serviced from the destination volume if the requested blocks were already written to the destination volume and if not, the second storage system requests from the first storage system the not-yet-migrated blocks, which are then provided to the host by the destination storage system. In other migration techniques, the redirection of access requests towards the destination volume is done only when the migration is completed, so the first storage system is responsible for replying to all access requests until the migration is completed. In these scenarios, the first storage system should duplicate every write request it receives from the host during the migration process and send it to the destination storage system, as well as writing to the source volume.

The reliability of data stored in storage volume is paramount. Switch or network based traffic duplication processes are not reliable enough and cannot be used for copying volume content.

SUMMARY

According to an embodiment of the invention there may be provided a method for updating a destination volume, the method may include (a) monitoring duplicate traffic that represents original traffic that is exchanged between at least one host computer and a first storage system; wherein the monitoring may be executed by a controller during an execution of a migration or a replication of a source volume of the first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and (b) controlling, based upon the monitoring, a process of updating the destination volume with a set of source volume updates, wherein the set of source volume updates are reflected in the duplicate traffic and are received during the execution of the migration or the replication.

The monitoring may be executed by the controller during the execution of the migration of the source volume to the destination volume.

The controlling may include updating the destination volume with the set of source volume updates when the monitoring indicates that the duplicate traffic represents all successful source volume updates that occurred during the execution of the migration.

The controlling may include maintaining in the second storage system the set of source volume updates when the monitoring indicates that the duplicate traffic represents all successful source volume updates of the source volume that occurred during the execution of the migration.

The monitoring may include determining that the duplicate traffic stopped to represent, at a certain point in time, all successful source volume updates that occurred between a beginning of the execution of the migration and the certain point in time.

The controlling may include re-starting the process of updating the destination volume when the monitoring indicates that the duplicate traffic stopped to represent, at a certain point in time, all successful source volume updates that occurred between a beginning of the execution of the migration and the certain point in time.

The method may include requesting the first storage system to start a new migration process of the source volume to the second storage system.

The new migration process may include migrating the certain point in time content of the source volume.

The method may include reconstructing missed duplicate traffic messages related to the source volume.

The monitoring may include detecting missed duplicate traffic messages based upon duplicate traffic metadata.

The duplicate traffic metadata may include message identifiers.

The missed duplicate traffic messages may include at least one pair of a request to update the source volume and a corresponding source volume update acknowledgement.

The monitoring may include detecting that the duplicate traffic may include a request to update the source volume and does not include a corresponding source volume update acknowledgement.

The monitoring may include detecting that the duplicate traffic may include a source volume update acknowledgement but does not include a corresponding request to update the source volume.

The method may include estimating a certain source volume update related to a certain portion of the source volume is not reflected in the duplicate traffic; and requesting from the first storage system to send the certain portion of the source volume.

The estimating may include finding a gap between an expected pattern of source volume updates and a pattern of source volume updates reflected by the duplicate traffic.

The controller may be included in the second storage system.

The controller may not be included in the second storage system.

The execution of the migration of the source volume to the second storage system may involve utilizing communication paths that differ from communication paths used to convey the duplicate traffic.

The monitoring may be executed by the controller during the execution of the replication of the source volume to the destination volume.

According to an embodiment of the invention there may be provided a non-transitory computer readable medium that may store instructions that once executed by a controller causes the controller to (a) monitor duplicate traffic that represents original traffic that is exchanged between at least one host computer and a first storage system; wherein the monitoring may be executed by a controller during an execution of a migration of a source volume of a first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and (b) control, based upon the monitoring, a process of updating the destination volume with a set of source volume updates, wherein the set of source volume updates are reflected in the duplicate traffic and are received during the execution of the migration.

According to an embodiment of the invention there may be provided a controller that may include a monitor and a control circuit, wherein the monitor may be arranged to monitor duplicate traffic that represents original traffic that is exchanged between at least one host computer and a first storage system; wherein the monitoring may be executed by monitor during an execution of a migration of a source volume of a first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and wherein the control circuit may be arranged to control, based upon the monitoring, a process of updating the destination volume with a set of source volume updates, wherein the set of source volume updates are reflected in the duplicate traffic and are received during the execution of the migration.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
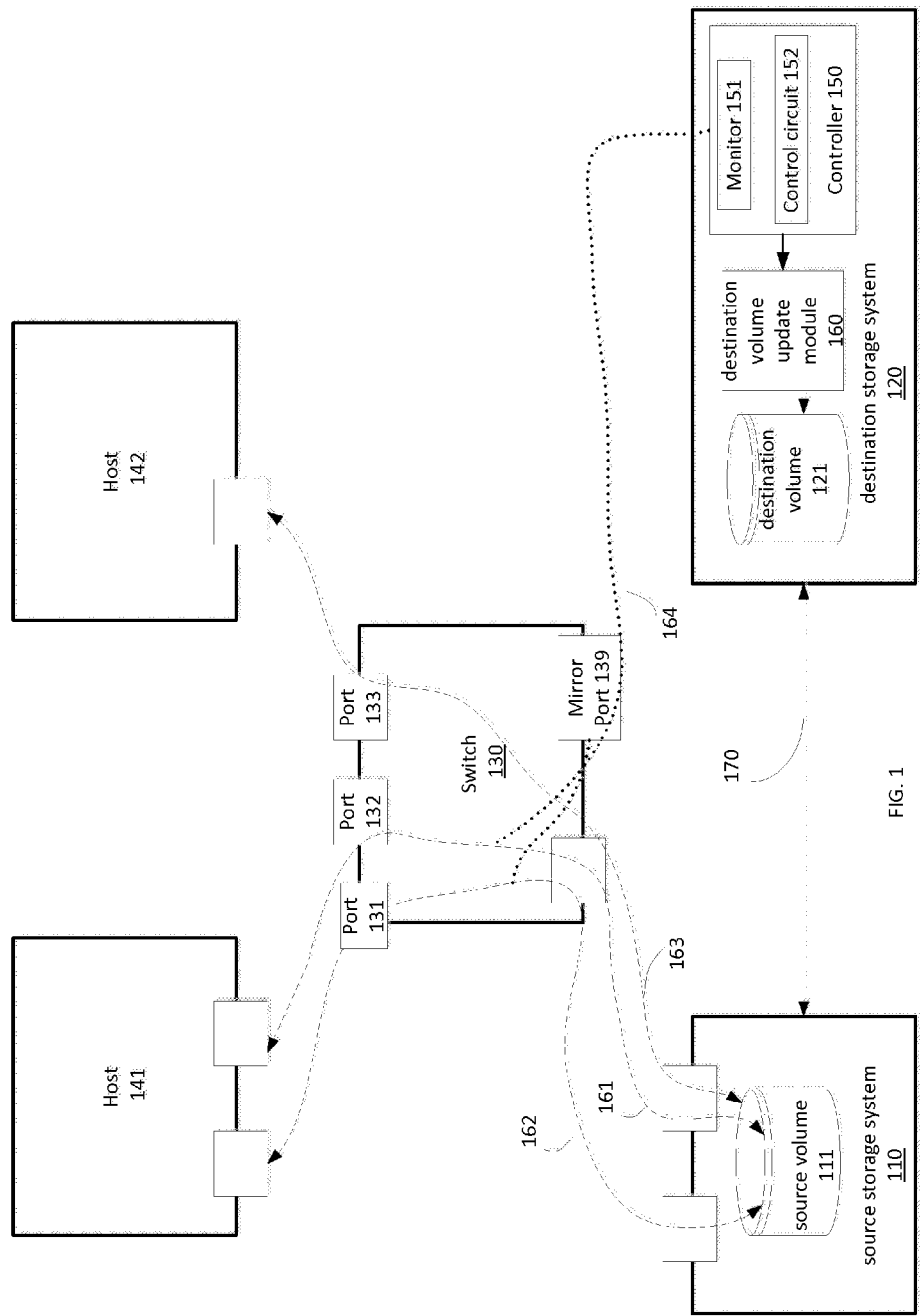
FIG. 1 illustrates a two storage systems, a host computer, a controller and a network according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference to the terms "comprising", "comprise", "comprises" and "including" should also be applied mutatis mutandis to a reference to the terms "consisting" and/or "consisting essentially of". Thus, for example, any reference to a method that includes various steps may refer to a method that may include additional steps but may also refer to a method that is limited only (or essentially limited to only) these various steps.

The provided controller and methods take advantage of the port mirroring feature provided by switches so as to manage volume migration or replication between a first storage system and a second storage system. The port mirroring process is supervised by a controller that may monitor the duplicate traffic produced by activating port mirroring for the original traffic related to the volume migration/replication, and determine whether (and how) to respond to source volume updates received during the migration process of the volume.

The term 'first storage system' can also be referred to as 'source storage system', "primary storage system" or 'local storage system'. The term 'second storage system' can be referred to as 'destination storage system', 'secondary storage system' or 'remote storage system'.

The terms 'duplicate', 'duplicated' and 'mirrored' are used in an interchangeable manner.

Any reference to a migration of a destination volume should be applied mutatis mutandis to a replication of a destination volume.

The term message may have its regular meaning. It may, for example, include any arrangement of bits that propagate in common over a communication path. A message may include one or more packets, may be the payload of one or more packets, may be a portion of a packet, a portion of a payload of a packet, and the like.

There may be provided a controller that receives the duplicate traffic from one or more switch of the network and conducts the migration/replication process on a second storage system. The controller may include a monitor and a control circuit. The controller and each one of the monitor and the control circuit may include hardware components and/or may be hosted by one of more hardware components. The hardware components may include a processor (such as but not limited to a general purpose processor, a digital signal processor, a central processing unit, a hardware accelerator), memory circuits, buses, ports, and the like. The controller may be a server computer, a desktop computer, a laptop computer, and the like. The monitor and the control unit may be implemented by separate hardware components and/or by the same hardware components.

Upon starting a process that requires replication or migration of a source volume in the first storage system to a destination volume in the second storage system, the controller, another component and/or a person may request the switch to activate port mirroring on a switch port that is coupled to the controller.

Figure 2:
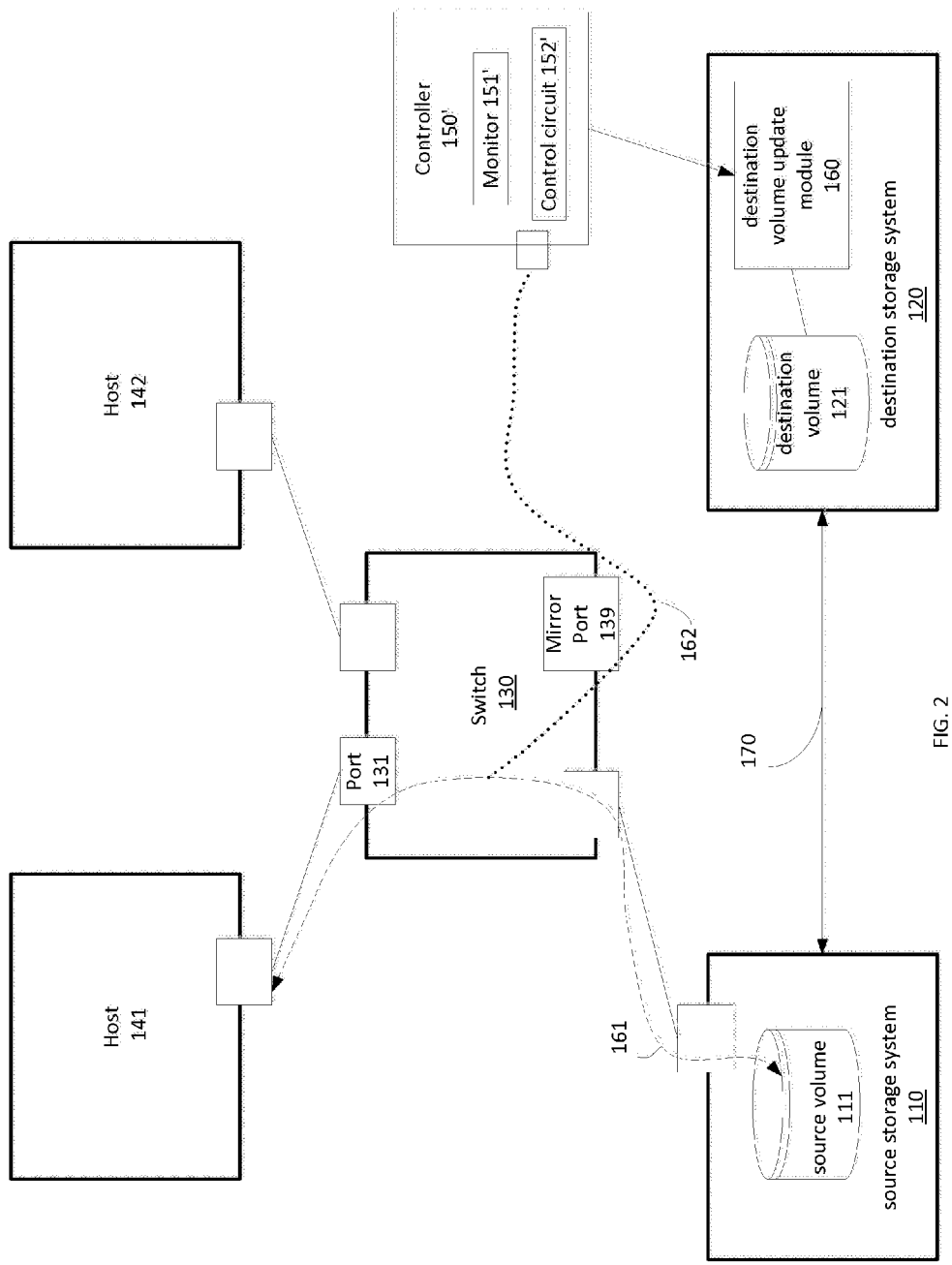
FIG. 2 illustrates a two storage systems, a host computer, a controller and a network according to an embodiment of the invention.

FIGS. 1 and 2 illustrate a first storage system 110 that includes a source volume 111 and a second storage system 120 that includes a destination volume 121.

Source volume 111 is to be replicated or migrated to destination volume 121. First storage system 110 and second storage system 120 are coupled to a network switch 130, which may be a Fibre Channel switch in a SAN network that connects host computers 141 and 142 with the storage systems.

Host computers 141 and 142 are coupled to the network switch 130 and send read/write requests towards first storage system 110. Source volume 111 may be accessed by one host only or by more than one host.

Network switch 130 includes multiple ports, such as ports 131, 132 that receive and transmit traffic from/to host 141 and port 133 that receives and transmits traffic from/to host 142. Network switch 130 further includes mirror port 139 for mirroring traffic.

The controller 150 may be coupled to mirror port 139 over the SAN network.

FIG. 1 illustrates controller 150 as being included in second storage system 120, while FIG. 2 illustrates controller 150 as a separate appliance coupled to the SAN network, which can communicate with second storage system 120 over the SAN.

Controller 150 can request network switch 130 to activate or deactivate a port mirroring towards a certain volume. The request for port mirroring may include the type of traffic to be duplicated, e.g. all traffic or only write requests.

Optionally, in addition to handling duplicate write requests, some control requests may also be duplicated by network switch 130 and handled by the controller 150. For example: reservation information directed to the source volume (using SCSI reserve commands and release commands, for exclusive usage of the volumes by the requesting host) should also be applied to the destination volume, so that when the migration is completed and the host access is redirected towards the destination volume, any reservation existed for the source volume before the redirection should still be valid when accessing the destination volume. So, upon receiving certain duplicate control requests, such as duplicate reservation/release request, the duplicate control request is forwarded to the destination storage system.

Suppose a volume migration for source volume 111 is requested. After the corresponding destination volume 121 is created in second storage system 120, controller 150 requests the network switch 130 to activate a port mirroring for all access requests directed to source volume 111 and their responses, or, if possible, only requests to update the source volume (write requests) directed to source volume 111 and their responses (such as corresponding source volume update acknowledgement, error messages and the like). Controller 150 then receives duplicate traffic that may include duplicate requests to update the source volume (from the host computer to the first storage system) and responses (from the first storage system to the host computer).

In FIGS. 1 and 2 dashed lines 161 and 162 represent two paths from host computer 141 to source volume 111, wherein the paths are configured to carry bidirectional original traffic of access requests (including requests to update the source volume) initiated by host computer 141 towards source volume 111 as well as respective responses (including corresponding source volume update acknowledgements) from source storage 110 towards host computer 141.

Source volume 111 may be accessed by more than one host computers. For example, host computer 142 uses a path represented by dashed line 163 for accessing source volume 111. The port mirroring should be applied to all paths ending at source volume 111.

Dotted line 164 represents a duplicate traffic that includes duplication of the access requests (including requests to update the source volume) and responses (including corresponding source volume update acknowledgements) represented by dashed lines 161, 162 and 163.

The duplicate traffic is initiated by the network switch and propagates through mirror port 139 that is coupled to controller 150 or 150'. More than one duplicate traffic can be activated and more than one mirror ports can be coupled to controller 150. Controller 150 is coupled to destination volume update module 160 that is configured to update the destination volume.

Figure 3:
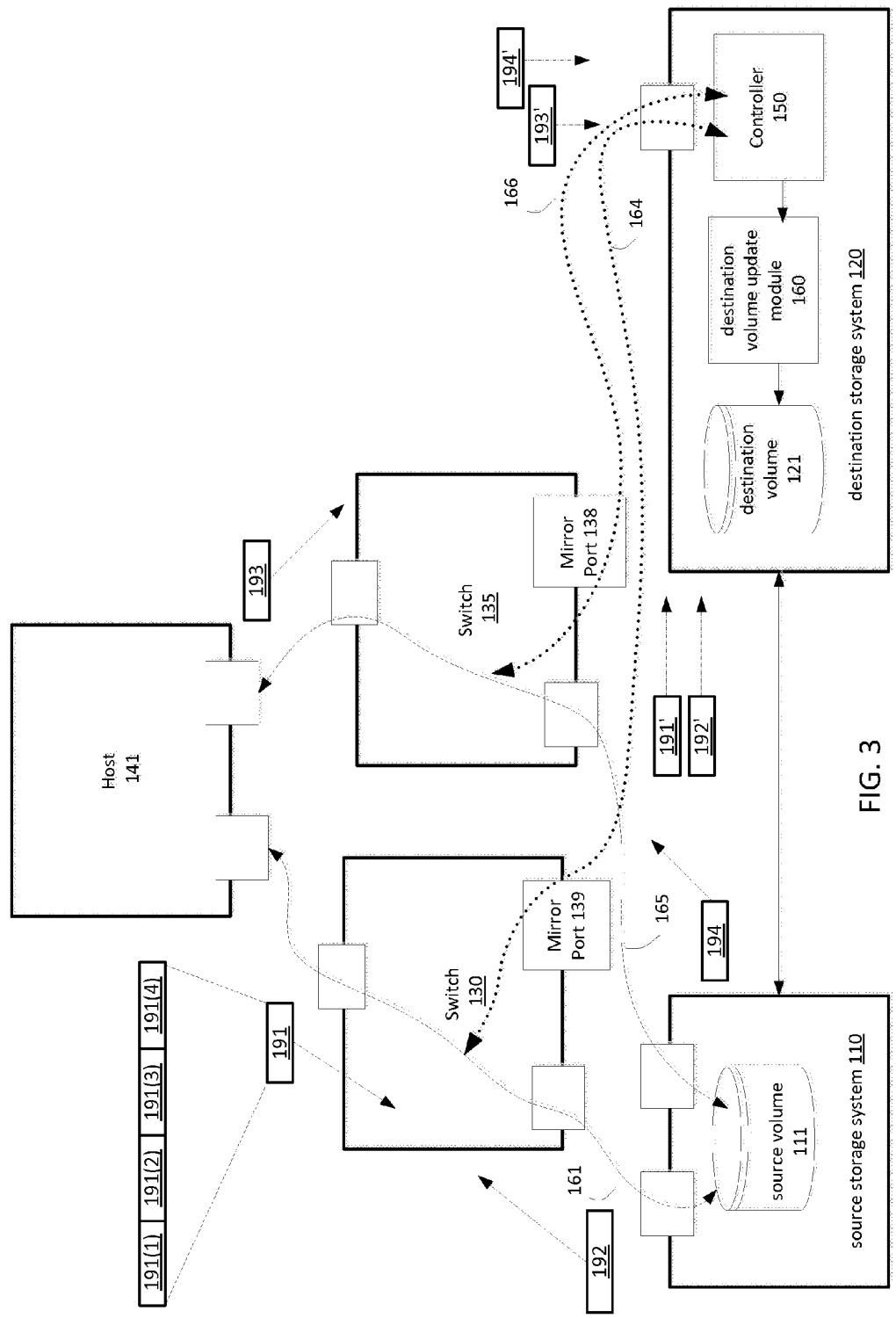
FIG. 3 illustrates a two storage systems, a host computer, a controller and a network according to an embodiment of the invention.

In FIG. 3 host computer 141 accesses source volume 111 via two network switches 130 and 135. Dashed line 161 represents a path from host computer 141 to source volume 111 via network switch 130 and dashed line 165 represents another path from host computer 141 to source volume 111 via network switch 135.

The port mirroring of each network switch should be activated for the path(s) passing through each network switch. In this case, controller 150 receives two duplicate traffics: a duplicate traffic 164 via mirror port 139 of network switch 130 and a duplicate traffic 166 via mirror port 138 of network switch 135.

FIG. 3 also illustrates the following messages (although each of the requests and acknowledgements may include multiple messages):

a. A request to update the source volume 191 that is sent from host computer 141, via network switch 130 and toward first storage system 110.
b. A duplicate request to update the source volume 191' that is sent from network switch 130 toward second storage system 120.
c. A source volume update acknowledgement 192 that is sent to host computer 141, via network switch 130 and from first storage system 110.
d. A duplicate source volume update acknowledgement 192' that is sent from network switch 130 toward second storage system 120.
e. A request to update the source volume 193 that is sent from host computer 141, via network switch 135 and toward first storage system 110.
f. A duplicate request to update the source volume 193' that is sent from network switch 135 toward second storage system 120.
g. A source volume update acknowledgement 194 that is sent to host computer 141, via network switch 135 and from first storage system 110.
h. A duplicate source volume update acknowledgement 194' that is sent from network switch 135 toward second storage system 120.

The request to update the source volume 191 may include multiple fields, such as sequential number (or other identifier) 191(1), command field 191(2), source volume identifier 191(3) and one or more other fields such as 191(4).

Controller 150 should be able to detect a case where it receives a duplicate request to update the source volume whose corresponding original request to update the source volume was not delivered to first storage system 110. On the other hand, controller 150 should be able to detect duplicate requests to update the source volume that were lost, and optionally, to determine whether the lost requests to update the source volume were received only by first storage system 110 or were not received by neither first storage system 110 nor by controller 150, where in the latter case, the lost requests to update the source volume can be ignored.

In order to implement in second storage system 120 only updates of the volume that were successfully executed in the first storage system 110, controller 150 can match duplicate requests to update the source volume with corresponding duplicate source volume update acknowledgements. A source volume update acknowledgement indicates that the source volume update requested in a corresponding request has been successfully executed by the first storage system 110 and therefore should be reflected in the destination volume. Therefore, controller 150 may request and/or instruct the second storage system to apply the relevant update in the destination volume only after it determines that the corresponding request has been successfully executed by the first storage system. In case controller 150 detects that a request to update the source volume was not successfully executed in the first storage volume, it may ignore the request to update the source volume.

In order to detect lost duplicate requests to update the source volume, controller 150 may monitor a sequence number of the duplicate requests to update the source volume, which may be provided in the protocol header or within the request to update the source volume sent by the host computer, may be provided by the network switch, and the like.

In a case of lost duplicate requests to update the source volume, the controller 150 can detect a gap in the sequence of duplicate requests to update the source volume, e.g. missing sequence numbers. Controller 150 may further detect duplicate responses (such as source volume update acknowledgements) to missing duplicate requests (e.g., responses whose sequence number do not match any request's sequence number) and determine that the write request has been received by first storage system 110 and not by controller 150. In this case, controller 150 can restart the migration process, requesting to resend the entire content of source volume 111 from first storage system 110.

Alternatively, controller 150 may be able to deduce the volume blocks addressed in the missing duplicate requests to update the source volume and ask to receive the deduced volume blocks from first storage system 110. In order to deduce the missing volume blocks, controller 150 may track the blocks addressed in the duplicate requests to update the source volume and may detect an access pattern.

Suppose, for example, that the duplicate traffic includes the following sequence:

a. A first request to update the source volume, having a sequence number of 10, and addresses blocks 100-110 of the source volume.
b. A second request to update the source volume, having a sequence number of 11, and addresses blocks 110-120 of the source volume.
c. A third request to update the source volume, having a sequence number of 13, and addresses blocks 130-140 of the source volume.

The duplicate traffic may also include first, second and third source volume update acknowledgements that correspond to the first, second and third requests to update the source volume.

Controller 150 detects a missing sequence number 12 and can deduce that the lost duplicate request to update the source volume was probably transmitted in the original traffic before the original request that were duplicated by the third request of the sequence. The lost request to update the source volume has a sequence number of 12 and addressed blocks 120-130 of the source volume.

Controller 150 can request first storage system 110 to read blocks 120-130 from the source volume 111 and prepare a write request with blocks 120-130 towards destination volume 121.

Figure 4:
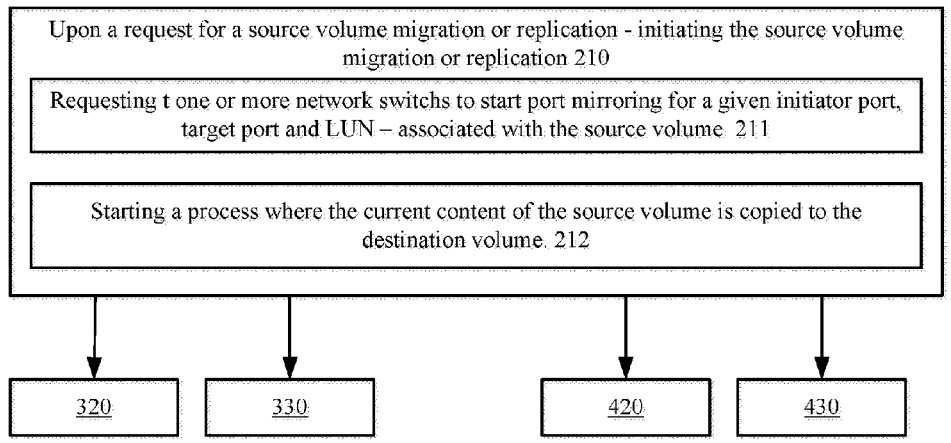
FIG. 4 illustrates a method according to an embodiment of the invention.

FIG. 4 illustrates a method 200 for migrating or replicating a source volume to a destination volume, using the port mirroring. Method 200 is activated when a migration or replication is requested.

Method 200 starts with step 210 of initiating a volume migration or replication.

Step 210 may include step 211 of requesting from at least one switch, coupled to the host computer, to start port mirroring for each host computer port (WWPN, World Wide Port Name) associated with the source volume. Generally more than one switch facilitates communication between the host computer and the storage system and typically for each volume to be accessed, multiple paths are defined, where the multiple paths are divided among the switches, e.g. half of the paths to a specific volume passes through one switch and the other half of paths passes through another switch.

Therefore, step 211 is repeated for each switch that is configured to carry traffic to the volume to be migrated and/or replicated and for each path within each switch that is configured to carry traffic to the volume to be migrated and/or replicated. The different paths associated with a specific volume are identified in the storage system by the different initiating host computer ports and target (storage) ports (WWPNs). The implementation of step 211 may be dependent on the way the switch implements the port mirroring. Some switches may provide the port mirroring service for specified pairs of host computer port and storage target port. Since more than one volume may be associated with a host computer port or even with a pair of host computer and storage port, step 220 of receiving duplicate messages may be required to filter out irrelevant duplicate requests. Filtering out irrelevant duplicate requests may include filtering out duplicate requests that address volumes other than the source volume or duplicate requests that do not change the volume, e.g. read requests.

Step 210 further includes step 212 of starting a copy process between the first storage system and the destination storage system, where the current content of the source volume is copied to an empty destination volume. This step includes creating a destination volume in the second storage system with no content (or initializing an existing volume) and requesting the first storage system to send the current content of the source volume. This step may be done according to techniques known in the art for transferring the current content of the volume. The term current content refers to content that was already written to the source volume prior to step 212.

Step 210 may be followed by stages 310 and 320 of method 300 (FIG. 5) if the process is a migration process and may be followed by stages 410 and 420 of method 400 (FIG. 6) if the process is a replication process.

Figure 5:
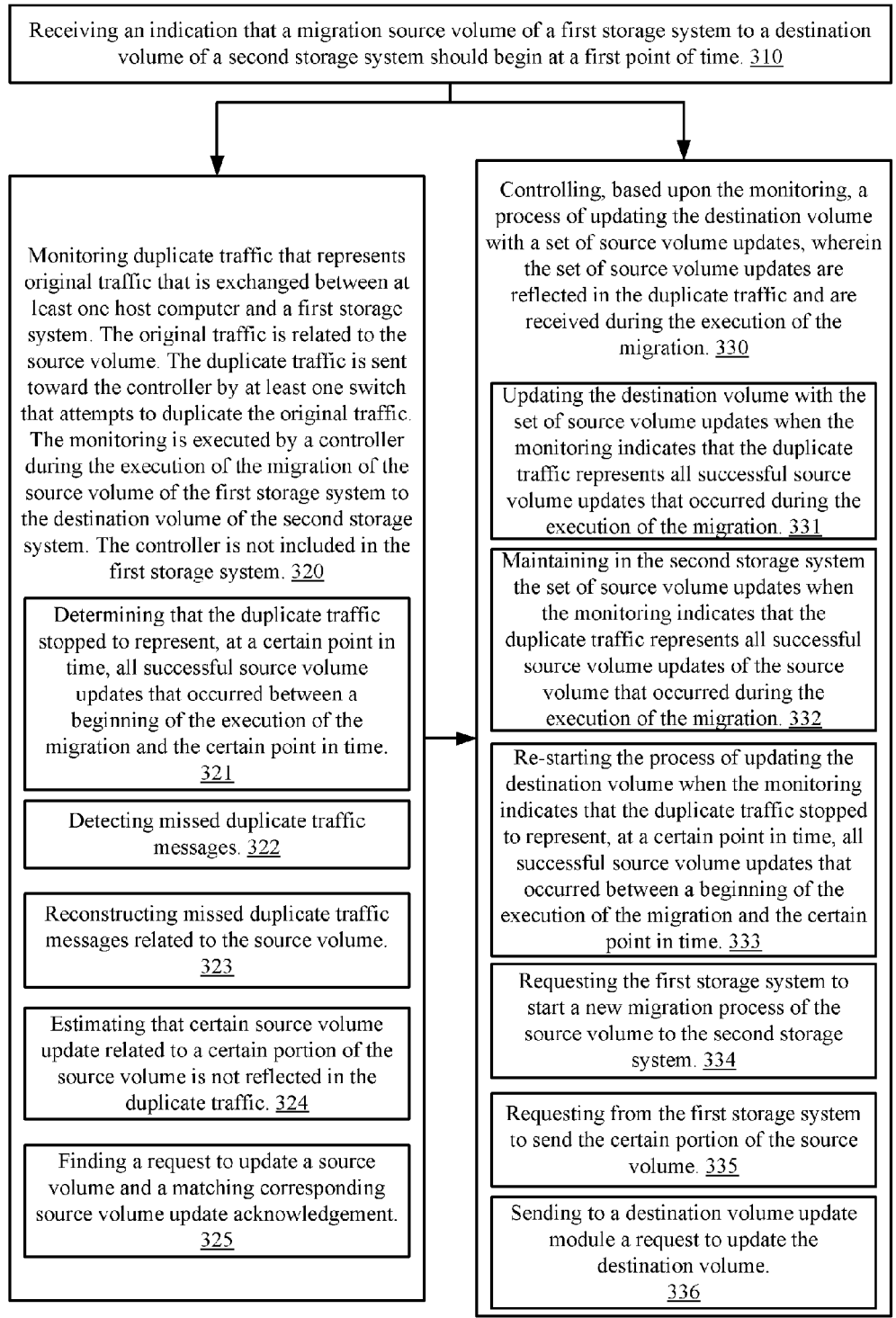
FIG. 5 illustrates a method according to an embodiment of the invention.

FIG. 5 illustrates method 300 according to an embodiment of the invention.

Method 300 may be executed by controller 150.

Method 300 may start by step 310 of receiving an indication that a migration of a source volume of a first storage system to a destination volume of a second storage system should begin at a first point of time. The indication may be a request to start the migration of the source volume at the first point of time. Step 310 may also include determining to start the migration of the source volume. The first point in time may be any point in time that followed the reception of the indication.

Step 310 may be followed by steps 320 and 330.

Step 320 may start before step 330 but both steps may be executed in parallel during the execution of the migration of the source volume.

Step 320 may include monitoring duplicate traffic that represents original traffic that is exchanged between at least one host computer and a first storage system. The original traffic is related to the source volume and includes requests initiated by the host computer (and corresponding responses from the first storage system) after the first point in time. The duplicate traffic is sent toward the controller by at least one switch that attempts to duplicate the original traffic.

The duplicate traffic may be filtered before reaching the controller or after reaching the controller to pass certain requests (such as write requests) while discarding other types of requests (such as read requests) or discarding requests directed to volumes other than the source volume.

The monitoring of step 320 may be executed by the controller during the execution of the migration of the source volume of the first storage system to the destination volume of the second storage system.

The controller is not included in the first storage system. It may be included in the second storage system or may not be included in the second storage system.

The execution of the migration of the source volume to the second storage system may involve utilizing communication paths that differ from communication paths used to convey the duplicate traffic. For example, path 170 of FIG. 1 is used for migration process between the first and second storage systems, while path 164 that is used for conveying the duplicate traffic.

Step 320 may include at least one of the following steps:
 a. Step 321 of determining that the duplicate traffic stopped to represent, at a certain point in time, all successful source volume updates that occurred between a beginning of the execution of the migration and the certain point in time.
 b. Step 322 of detecting missed duplicate traffic messages.
 c. Step 323 of reconstructing missed duplicate traffic messages related to the source volume. The reconstructing may be executed in response to step 321 or 322 or 324.
 d. Step 324 of estimating that certain source volume update related to a certain portion of the source volume is not reflected in the duplicate traffic. Step 324 may be followed by step 335 of requesting from the first storage system to send the certain portion of the source volume. Step 324 may include finding a gap between an expected pattern of source volume updates and a pattern of source volume updates reflected by the duplicate traffic. An expected pattern may refer for example to the sequence of the duplicate traffic (e.g. sequence number of messages), or a pattern of volume addresses included in requests within the duplicate traffic, or a combination of both sequence and volume addresses.
 e. Stage 325 of finding a request to update a source volume and a matching corresponding source volume update acknowledgement. This may be followed by sending a request to a destination volume update module to update the second volume accordingly. Additionally or alternatively the finding of such a pair may be followed by searching whether the reception of this pair is indicative of one or more missing pairs, whether the destination volume update process is proper or not (whether a continuous sequence of such pairs has been received from the beginning of the migration process, and the like).

It can be determined that the duplicate traffic represents successful source volume updates when, for example, at least one or all of the following conditions are fulfilled: there are no missed duplicate traffic messages, or when it can be estimated that the source volume updates related to a certain portion of the source volume are reflected in the duplicate traffic, or when the requests to update a source volume (reflected by the duplicate traffic) match corresponding source volume update acknowledgements (also reflected by the duplicate traffic). It can be determined that the duplicate traffic stopped to represent all successful source volume updates when, for example, at least one of the above conditions is not fulfilled.

Step 322 may include detecting of missed duplicate traffic messages based upon duplicate traffic metadata. The duplicate traffic metadata may include message identifiers. Message identifiers may be sequence numbers assigned to all duplicate traffic messages or only to certain type of duplicate traffic messages (such as duplicate traffic messages that are related to source volume updates). The duplicate traffic metadata may be assigned by the switch, by the host or by any other entity in the network.

Typically a source volume update is reflected by a pair of sets of messages—one set of messages may include at least one duplicate traffic messages that include a request to update the source volume and a second set of messages may include one or more duplicate traffic messages that include a corresponding source volume update acknowledgement.

It may be easier to detect and/or reconstruct a missed duplicate traffic message if a corresponding duplicate traffic message of a source volume update acknowledgement is detected and it may be even easier to reconstruct data that is missing in one of these messages. For example—step 322 may include detecting, in the duplicate traffic, a request to update the source volume but failing to detect a corresponding source volume update acknowledgement. Yet for another example—step 322 may include detecting that the duplicate traffic comprises a source volume update acknowledgement but does not include a corresponding request to update the source volume. Yet for another example—a field within a received duplicate traffic message is corrupted, e.g. if a field relating to an identity of the source volume or the block addresses within the volume or a sequence number is missing or corrupted in one of the messages it may be reconstructed from other messages.

It may be harder to detect that the entire original traffic related to a certain volume update is not reflected in the duplicate traffic—thus both the request to perform the certain source volume update and the corresponding source volume update acknowledgement are not detected in the duplicate traffic.

Such a detection may be based upon a deviation of the duplicate traffic from an expected duplicate traffic pattern. For example—if the controller detects that there is a gap in a sequential write pattern—it may conclude that the gap may be contributed to a traffic duplication problem and may request from the first storage system to send it the content of the volume that is related to the gap—or request from the first storage system, from the network or even from the host computer to send the missing content.

Step 330 may include controlling, based upon the monitoring, a process of updating the destination volume with a set of source volume updates, wherein the set of source volume updates are reflected in the duplicate traffic and are received during the execution of the migration.

Step 330 may include at least one of the following steps:
  a. Step 331 of updating the destination volume with the set of source volume updates when the monitoring indicates that the duplicate traffic represents all successful source volume updates that occurred during the execution of the migration.
  b. Step 332 of maintaining in the second storage system the set of source volume updates when the monitoring indicates that the duplicate traffic represents all successful source volume updates of the source volume that occurred during the execution of the migration. The maintaining may include temporarily saving the set of source volume updates, separately from the destination volume, e.g., in a journal file, and after all updates related to the content of the source volume at the first point in time are received from the first storage system and written to the destination volume, the set of source volume updates are used to update the destination volume.
  c. Step 333 of re-starting the process of updating the destination volume when the monitoring indicates that the duplicate traffic stopped to represent, at a certain point in time, all successful source volume updates that occurred between a beginning of the execution of the migration and the certain point in time.
  d. Step 334 of requesting the first storage system to start a new migration process of the source volume to the second storage system. The new migration process may include asking to perform the new migrating to include migrating the certain point in time content of the source volume (and not the content of the source volume at the start of the migration process—at the first point in time).
  e. Step 335 of requesting from the first storage system to send the certain portion of the source volume.

Figure 6:
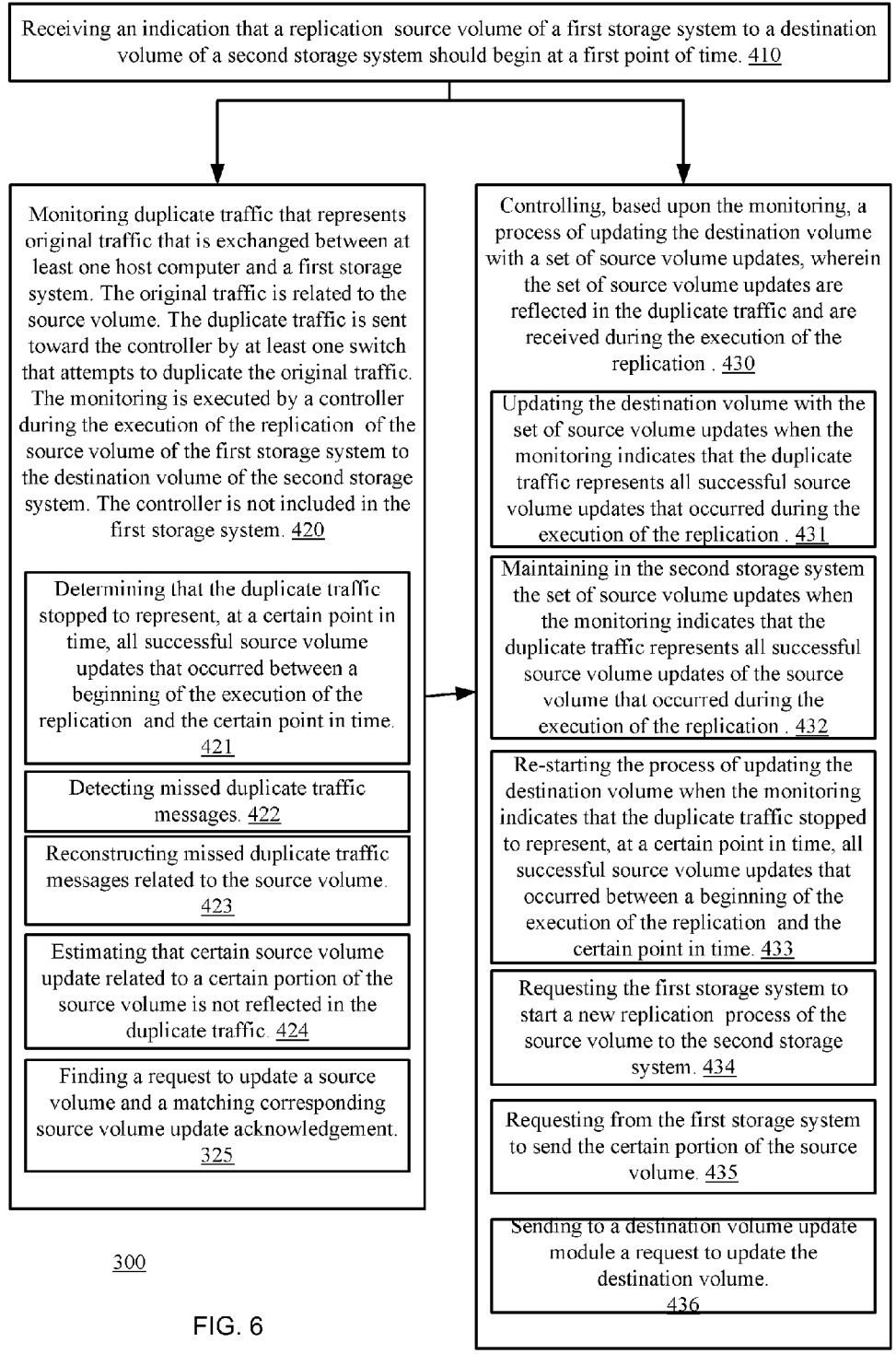
FIG. 6 illustrates a method according to an embodiment of the invention.

FIG. 6 illustrates method 400 according to an embodiment of the invention.

Method 400 includes steps 410, 420 and 430. Step 420 may include steps 421, 422, 423 and 424. Step 430 may include steps 431, 432, 433, 434 and 435. Method 400 differs from method 300 by managing volume updates related to a replication process while method 300 manages volume updates related to a migration process. Method 400 is expected to be more resource consuming than method 300. In some case the bandwidth and/or reliability level that can be associated with the monitoring can suffice to execute method 300 and not method 400. It is also noted that method 300 may also include performing the migration of the source volume (its content as reflected at the beginning of the migration).

Figure 7:
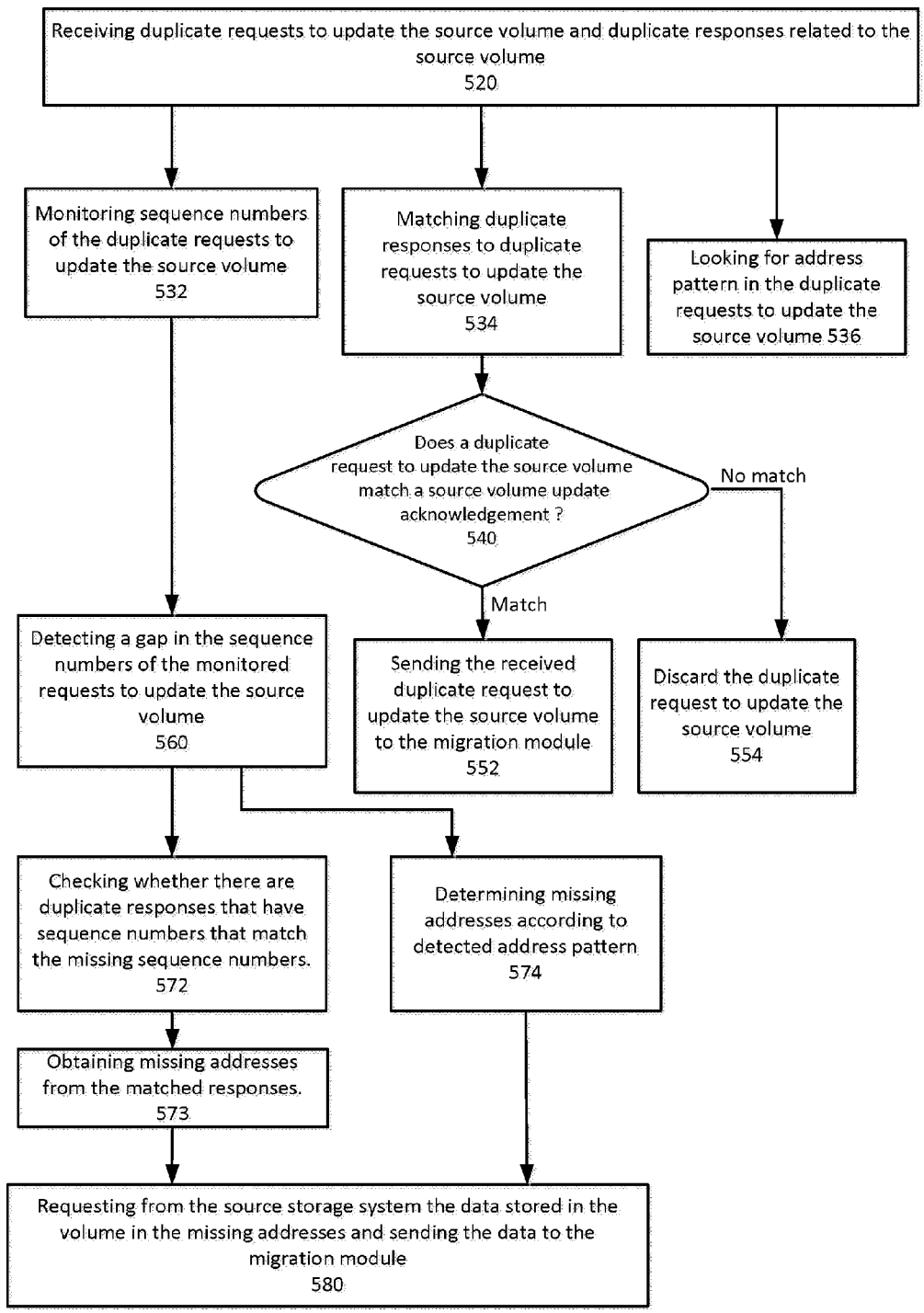
FIG. 7 illustrates a method according to an embodiment of the invention.

FIG. 7 illustrates method 500 according to an embodiment of the invention.

Method 500 may start by step 520 of receiving duplicate requests to update the source volume and duplicate responses related to the requests to update the source volume. The responses may include a source volume update acknowledgement, a response that indicates that the requested source volume update is denied and/or did not succeed, and the like.

Step 520 may be followed by steps 532, 534 and 536.

Step 520 can be performed in parallel to steps 532-580 but with different duplicate host computer requests involved in different steps.

Step 534 includes matching duplicate responses to duplicate host computer requests.

A matched duplicate storage response guarantees that the corresponding request for updating the source volume has been implemented in the first storage system and acknowledged to the host computer. Thus, only duplicate host computer requests that have matching duplicate responses are implemented in the destination storage system. The matching of a duplicate storage response to a corresponding duplicate request for updating the source volume can be done according to an identifier that may be unique and shared between the request and response, for example: the sequence number or any other identifier used by the protocol.

Step 534 may be followed by decision step 540 of determining whether a duplicate request for updating the source volume matches a source volume update acknowledgement.

In case where a match is found, step 540 may be followed by step 552 of sending the duplicate request for updating the source volume to the destination volume update module for performing the requested update—but in the destination volume.

In case where no match was found, it may be assumed that the request for updating the source volume was not received or not implemented by the first storage system and in this case, step 540 may be followed by step 554 of discarding the duplicate request for updating the source volume.

According to another embodiment, it can be assumed that the request for updating the source volume was received by the local storage system but the duplicate source volume update acknowledgement was lost. In this case, the request for updating the source volume may be regarded as a missed request and step 540 may be followed by step 580, using the addresses included in the certain duplicate host computer request.

Step 536 includes looking for address pattern in the duplicate requests to update the source volume. An address pattern is correlated with sequence number patterns, for example: requests with sequence numbers 11, 12 and 13 respectively include address ranges to be written: 100, 110, 120, each with size 10.

Step 532 includes monitoring sequence numbers of the duplicate request for updating the source volume. The sequence numbers may be included in the transport protocol header (e.g., Fibre Channel, iSCSI), may be included in a header of the IO request (e.g., in a spare field or dedicated field of the SCSI's CDB (Command descriptor block) or in any proprietary field within the request for updating the source volume. Step 532 may assume that the duplicate requests for updating the source volume can be out of order and may use a buffer to store recently sequence numbers.

Step 532 may be followed by step 560 of detecting a gap in the sequence numbers. The following embodiments can be implemented to detect a gap while considering an out-of-order arrival of duplicate requests for updating the source volume. When a sequence number is skipped, a time counter since the skipping of the missing sequence number will be triggered and only if a certain time threshold has elapsed, the missing sequence number will be considered as a gap. For example, if requests for updating the source volume with the following sequence numbers have been: 10, 11 and 13, then missing sequence number 12 would not be considered as causing a gap, until the time elapsed since the reception of sequence number 13 exceeds the certain time threshold. Alternatively, the missing sequence number would be considered as causing a gap only after at least predefined sequence numbers have been received. For example, after ten sequence numbers that are larger than the missed sequence number have been received (e.g., all number from 13 to 22 have been received since number 12 was skipped), or alternatively, when a sequence number, that is larger by at least e.g. ten from the missing sequence number, has been received (e.g., number 22 has been received).

Step 560 may be followed by any one of the steps 512, 572, 574. The meaning of re-executing step 512 may be that the process may restart from an empty destination volume. This step can be re-executed when a consistency with the source volume cannot be guaranteed.

Step 572 includes checking whether there are duplicate source volume update acknowledgements that correspond to missed duplicate requests for updating the source volume in the gap. If so jumping to step 573 of obtaining missing addresses from the matched source volume update acknowledgements. Source volume update acknowledgements may include the addresses indicated in the corresponding request for updating the source volume.

Step 573 may be followed by step 580 of requesting from the first storage system the data stored in the source volume in the missing addresses and upon receiving a response that includes the data stored in the missing addresses—sending the data to the destination volume update module.

Step 560 of detecting a gap can be alternatively be followed by step 574 of determining the missing addresses according to detected address pattern, in case such address pattern has been detected in step 536. For example, suppose the missing sequence number is 13 and step 536 detected address pattern that is composed of the addresses: 100, 110 and 120, all of range length 10, respectively for sequence numbers 10, 11 and 12, and then was a duplicate request with sequence number 14 and address 140 with length 10, then it can be determined that the missing addresses are 130-139.

Step 574 may be followed by step 580 described above, using the missing addresses that were determined according to the detected address pattern.

A similar method can be implemented for volume replication.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (TO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for updating a destination volume, the method comprises:
monitoring duplicate traffic that represents original traffic that is exchanged between at least one host computer and a first storage system;
wherein the monitoring is executed by a controller during an execution of a migration or a replication of a source volume of a first storage system to a destination volume of a second storage system; wherein the controller is not included in the first storage system;

wherein the original traffic is related to the source volume;

wherein the duplicate traffic is sent toward the controller by at least one switch that attempts to duplicate the original traffic; and controlling, based upon the monitoring, a process of updating the destination volume with a set of source volume updates, wherein the set of source volume updates are reflected in the duplicate traffic and are received during the execution of the migration or the replication.

2. The method according to claim 1 wherein the monitoring is executed by the controller during the execution of the migration of the source volume to the destination volume.

3. The method according to claim 2, wherein the controlling comprises updating the destination volume with the set of source volume updates when the monitoring indicates that the duplicate traffic represents all successful source volume updates that occurred during the execution of the migration.

4. The method according to claim 2, wherein the controlling comprises maintaining in the second storage system the set of source volume updates when the monitoring indicates that the duplicate traffic represents all successful source volume updates of the source volume that occurred during the execution of the migration.

5. The method according to claim 2, wherein the monitoring comprises determining that the duplicate traffic stopped to represent, at a certain point in time, all successful source volume updates that occurred between a beginning of the execution of the migration and the certain point in time.

6. The method according to claim 2, wherein the controlling comprises re-starting the process of updating the destination volume when the monitoring indicates that the duplicate traffic stopped to represent, at a certain point in time, all successful source volume updates that occurred between a beginning of the execution of the migration and the certain point in time.

7. The method according to claim 6, further comprising requesting the first storage system to start a new migration process of the source volume to the second storage system.

8. The method according to claim 7, wherein the new migration process comprises migrating the certain point in time content of the source volume.

9. The method according to claim 2, comprising reconstructing missed duplicate traffic messages related to the source volume.

10. The method according to claim 2, wherein the monitoring comprises detecting missed duplicate traffic messages based upon duplicate traffic metadata.

11. The method according to claim 10, wherein the duplicate traffic metadata comprises message identifiers.

12. The method according to claim 10, wherein the missed duplicate traffic messages comprise at least one pair of a request to update the source volume and a corresponding source volume update acknowledgement.

13. The method according to claim 2, wherein the monitoring comprises detecting that the duplicate traffic comprises a request to update the source volume and does not include a corresponding source volume update acknowledgement.

14. The method according to claim 2, wherein the monitoring comprises detecting that the duplicate traffic comprises a source volume update acknowledgement but does not include a corresponding request to update the source volume.

15. The method according to claim 2, comprising estimating a certain source volume update related to a certain portion of the source volume is not reflected in the duplicate traffic; and requesting from the first storage system to send the certain portion of the source volume.

16. The method according to claim 15, wherein the estimating that certain source volume update that was performed by the first storage system is not reflected in the duplicate traffic comprises finding a gap between an expected pattern of source volume updates and a pattern of source volume updates reflected by the duplicate traffic.

17. The method according to claim 2, wherein the execution of the migration of the source volume to the second storage system involves utilizing communication paths that differ from communication paths used to convey the duplicate traffic.

18. The method according to claim 1, wherein the controller is included in the second storage system.

19. The method according to claim 1, wherein the controller is not included in the second storage system.

20. The method according to claim 1 wherein the monitoring is executed by the controller during the execution of the replication of the source volume to the destination volume.

21. A non-transitory computer readable medium that stores instructions that once executed by a controller causes the controller to: (a) monitor duplicate traffic that represents original traffic that is exchanged between at least one host computer and a first storage system; wherein the monitoring is executed by the controller during an execution of a migration of a source volume of a first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and (b) control, based upon the monitoring, a process of updating the destination volume with a set of source volume updates, wherein the set of source volume updates are reflected in the duplicate traffic and are received during the execution of the migration.

22. A controller that comprises a monitor and a control circuit, wherein the monitor is arranged to monitor duplicate traffic that represents original traffic that is exchanged between at least one host computer and a first storage system; wherein the monitoring is executed by a controller during an execution of a migration of a source volume of a first storage system to a destination volume of a second storage system; wherein the controller is not included in the first storage system; wherein the original traffic is related to the source volume; wherein the duplicate traffic is sent toward the controller by at least one switch that attempts to duplicate the original traffic; and wherein the control circuit is arranged to control, based upon the monitoring, a process of updating the destination volume with a set of source volume updates, wherein the set of source volume updates are reflected in the duplicate traffic and are received during the execution of the migration.

* * * * *